(12) United States Patent
Bormotov

(10) Patent No.: US 11,994,090 B2
(45) Date of Patent: May 28, 2024

(54) PULSE DETONATION JET ENGINE

(71) Applicant: OBSHCHESTVO S OGRANICHENNOJ OTVETSTVENOST'YU "VASP EJRKRAFT", Moscow (RU)

(72) Inventor: Andrei Gennadevich Bormotov, selo Malaya Laya (RU)

(73) Assignee: OBSHCHESTVO S OGRANICHENNOJ OTVETSTVENNOST'YU "VASP EJRKRAFT", Moscow (RU)

( * ) Notice: Subject to any disclaimer, the term of this patent is extended or adjusted under 35 U.S.C. 154(b) by 86 days.

(21) Appl. No.: 17/794,196

(22) PCT Filed: Oct. 1, 2021

(86) PCT No.: PCT/RU2021/050323
§ 371 (c)(1),
(2) Date: Jul. 20, 2022

(87) PCT Pub. No.: WO2022/131959
PCT Pub. Date: Jun. 23, 2022

(65) Prior Publication Data
US 2023/0313757 A1 Oct. 5, 2023

(30) Foreign Application Priority Data

Dec. 16, 2020 (RU) .................................. 2020141643

(51) Int. Cl.
*F02K 7/04* (2006.01)

(52) U.S. Cl.
CPC ............ *F02K 7/04* (2013.01); *F05D 2240/35* (2013.01)

(58) Field of Classification Search
CPC ...... F23R 7/00; F02K 7/02; F02K 7/04; F23C 15/00
See application file for complete search history.

(56) References Cited

U.S. PATENT DOCUMENTS

| 6,883,302 | B2 | 4/2005 | Koshoffer |
| 6,983,586 | B2 | 1/2006 | Tangirala et al. |
| 8,402,745 | B2 * | 3/2013 | Denne ................ F02K 7/02 60/247 |

FOREIGN PATENT DOCUMENTS

| RU | 2066779 C1 * | 9/1996 |
| RU | 2282044 | 8/2006 |

(Continued)

OTHER PUBLICATIONS

International Search Report for PCT/RU2021/050323 dated Jan. 13, 2022, 3 pages.

*Primary Examiner* — David P. Olynick
(74) *Attorney, Agent, or Firm* — Nixon & Vanderhye PC

(57) ABSTRACT

Increased efficiency and reliability is achieved in an engine with a combustion chamber structured as detonation resonator with an outlet to an exhaust nozzle. The resonator is formed as an aspherical reflector symmetrical with respect to the engine axis. The engine uses gaseous fuels and a gaseous oxidizer in a single stage combustion process. A pyrolyzing chamber for hydrocarbon fuel. Pyrolyzing is achieved by contact of fuel flow with heated back side of the reflector. A mixture of fuel and oxidizer is supplied into the combustion chamber through an annular supersonic injection system. To initiate detonation, these engines may have a detonation initiator formed as a tube plugged at the distal end and open at the end inserted into the combustion chamber and located along the axis of the engine. Detonation products ejected through the exhaust nozzle create thrust that pushes the engine in the opposite direction.

20 Claims, 2 Drawing Sheets

(56) References Cited

FOREIGN PATENT DOCUMENTS

| | | |
|---|---|---|
| RU | 2406865 | 12/2010 |
| RU | 2493399 | 9/2013 |
| RU | 2524591 | 7/2014 |
| RU | 2573427 | 1/2016 |
| RU | 2684352 C1 * | 4/2019 |

* cited by examiner

PULSE DETONATION JET ENGINE

CROSS-REFERENCE TO RELATED APPLICATIONS

This application is the U.S. national phase of International Application No. PCT/RU2021/050323 filed Oct. 1, 2021 which designated the U.S. and claims priority to RU Patent Application No. 2020141643 filed Dec. 16, 2020, the entire contents of each of which are hereby incorporated by reference.

TECHNICAL FIELD

The invention primarily relates to the field of jet propulsion engines and more specifically pulse detonation type jet engines having a combustion chamber with aspheric element.

PRIOR-ART

Known the two-stage pulse detonation system in the US patent [US 6983586 B2, F02K 3/10, 7/05, 7/075, F23C 11/04, U.S. Cl. 60/39.77, 60/226.1. 60/247, 60/249, 60/762, Aug. 12, 2003] includes a pre-combustor and a geometric resonator connected via a converging-diverging nozzle to the pre-combustor to create a high temperature and high pressure conditions in the resonator in order to create optimal conditions for detonation initiation. A mixture of a fuel and a gas is burned in the pre-combustor and is passed through the nozzle into the geometric resonator, where the burned mixture is detonated. The detonation propagates through the resonator exit nozzle thus generating thrust.

The disadvantage of this device is two-stage process, in which during the burning in pre-combustor the internal energy of the fuel is dissipated, which reduces the efficiency and economy of this system.

As mostly close by design is known detonation combustion pulsejet engine in the patent of the Russian Federation [RU 2282044, C1, F02K7/04, Aug. 20, 2006] which has body with combustion chamber with input, circular channel with input and output, converter of working medium internal energy into mechanical work of thrust in form of gas-dynamic resonator, engine nozzle, detonation initiating mechanism and annular nozzle to feed fuel-air mixture. Combustion chamber is made in form of semispherical gas-dynamic resonator and exit nozzle of pulsejet engine. Detonation initiator is made in form of tube stopped from one side, free output of which is connected with center of gas-dynamic resonator, ratio of detonation products velocity to fuel-air mixture delivery speed should be greater than or equal to ratio of two lengths of detonation initiator to radius of resonator.

The disadvantage of this device is the need for its effective detonation to fulfill a constructively defined ratio of the fuel mixture feed rate and the outflow rate of the detonation products, which requires special fuel preparation and significantly complicates the design of the propulsion power unit.

Another disadvantage of the device is the use of a spherical shape of the resonator of the combustion chamber, which is not the optimal shape for cumulation of the detonation wave and, as a consequence, the efficiency of detonation combustion.

BACKGROUND OF INVENTION

Subject Matter of Invention

The technical objective of the inventions are to increase the performance of pulse detonation jet engines, which is characterized by high the efficiency, the specific power and the reliability and safety of its operation, which is especially important in the case of using the jet engine as tip jet of rotor in flying vehicle.

The technical results of the invention are:
simplifying of structure and operation cycle to make it more reliable;
minimizing weight of jet engine, which is especially important under conditions of significant (over 300 g) centrifugal forces;
increasing efficiency and thrust force of pulse detonation jet engine, which, in combination with low weight, increase specific engine power.

A high performance pulse detonation jet engine of the invention is formed with a special purpose combustion chamber that supports a gas-dynamic detonation resonance. In addition these special combustion chambers in unique combination with special fuel and oxidizer conveyance operable as a single stage process which in case of usage gaseous fuel, provide performance and reliability parameters not found in any arrangements in the state-of-the-art. Oxidizer and fuel is delivered into the combustion chamber by the conveyance systems having highly unique physical structures that give rise to advantageous conditions. For example, flow rates, temperature, pressure, mixing, geometric advantages, frequency of pulsing, structure simplicity among others are a result of the particular arrangements of an oxidizer delivery system and a fuel delivery system which work cooperatively together. Still further, these in particular cooperation with the combustion chamber itself and not required for that special fuel or special stage of fuel preparation in reactor or in precombustion chamber.

SUMMARY OF THE INVENTION

The invention relates to jet engines, in particular to pulse detonation jet engines. The engine has a combustion chamber which is structured as detonation resonator with an outlet to the exhaust nozzle. The resonator has form of an aspherical reflector symmetric with respect to an engine system axis. The engine uses gaseous fuels and gaseous oxidizer and single stage combustion process with no precombustion or any other energy consuming means for increasing fuel detonation abilities. In one referred version, a combination of gaseous fuel and oxidizer is propane and air. In versions having hydrocarbon fuel as design choice such as propane, the fuel conduit has a pyrolyzing cavity. Fuel supplying nozzle directs flow of fuel over heated outside surface of combustion chamber's reflector that causes fuel to pyrolyze. A mixture of fuel and oxidizer is supplied into the combustion chamber through an annular supersonic injection system which allows very uniform mixture by density of fuel and oxidizer. This condition is especially important for reliability of detonation process in these systems having the engine under conditions of high (over 300 g) centrifugal forces which otherwise tend to cause separation of mixture. To trigger detonation, these engines have a detonation initiator in the form of a tube plugged at the distal end and open at an end inserted into the combustion chamber and located along the axis of the engine. This manner of initiating detonation is reliable because it doesn't require use of any mechanical moving structure as valve or flap. As such efficiency is improved because the system doesn't consume additional energy for spark plugs, lasers and others. Detonation products ejected through the exhaust nozzle create thrust that pushes the engine in the opposite direction. One preferred shape of a reflector is parabolic to promote acceleration of detonation products to flow through exhaust nozzle, and provide for an intrinsic system frequency of pulse detonation and finally result in thrust of engine. These designs of engines, all shapes and sizes of which are coordinated on the basis of the laws of gas dynamics, allows maintaining cyclic resonant detonation at a frequency of around 10 kHz. This design of the pulse detonation jet engine is simple, reliable and allows achieving high efficiency of generation of thrust propulsion force.

BRIEF DESCRIPTION OF THE DRAWING FIGURES

Figure 1:
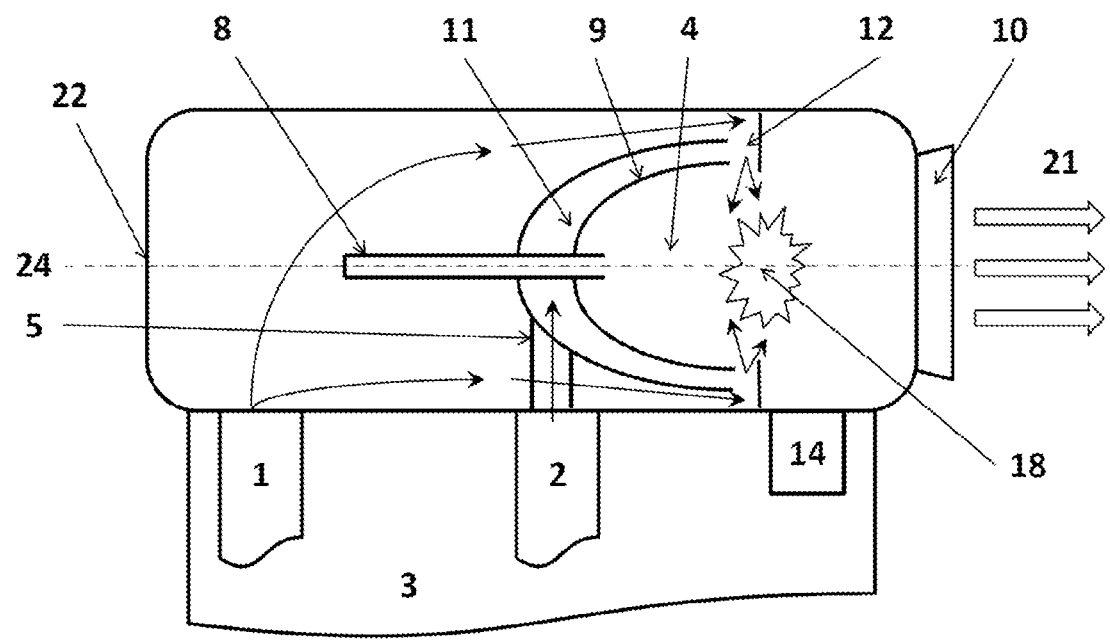
FIG. 1 shows the layout of the pulse-detonation jet engine.

The numbers in the figures indicate: 1—entrance to the gaseous oxidizer supply system, 2—entrance to the gaseous fuel supply system, 3—holder of jet engine, 4—combustion chamber, 5—fuel supply nozzle, 6—open terminal end of gaseous oxidizer supply system forming as annular slit, 7—open terminal end of gaseous fuel supply system forming as annular slit, 8—detonation initiator as a tube, 9—metal reflector, 10—exhaust nozzle, 11—cavity in between complementary shaped bodies of rotation as reflector and pyrolyzing cavity cover, 12—mixing chamber, 13—mix nozzle, 14—apex of reflector, 15—apex of pyrolyzing cavity cover, 16—spiral flow of gaseous fuel, 17—detonation initiator is spark plug, 18—zone of detonation, 19—gaseous oxidizer flow, 20—gaseous fuel flow, 21—jet of detonation products, 22—body of jet engine, 23—pyrolyzing cavity cover, 24—system axis, 25—supersonic flow of gaseous fuel and air mixture

DETAILED DESCRIPTION OF THE INVENTION

Pulse Detonation Jet Engine

Jet engine is a type of reaction engine discharging a fast-moving stream that generates thrust by jet propulsion. Presented invention relates to internal combustion engine, where said jet is products of combustion of mixture of fuel and oxidizer. More precisely, the invention relates to pulse detonation jet engine, where combustion is characterized as a pulse detonation process. The onset of the detonation process is defined by the inflow of a detonatable mixture of fuel and oxidizer, brought to the state of detonation excitation. To get detonation excitation, the engine has special complex of structures which define a resonator. To trigger pulse detonation, an engine uses a detonation initiator. The detonation initiator regulates in part the detonation cycle. A pulse detonation jet engine of the invention has a body with the following major elements:
  Combustion chamber
  Fuel conveyance system
  Oxidizer conveyance system
  Detonation initiator.

All parts are working in cooperation with each other to achieve pulsating detonation.

Combustion Chamber

A combustion chamber is primarily comprised of a reflector element and an exhaust nozzle each symmetrically arranged about a system axis to form a partially enclosed space therebetween in which combustion may be effected.

The combustion chamber is arranged to receive a fuel and oxidizer or their mixture from an annular injection system, or plurality thereof, disposed concentric with the reflector and exhaust nozzle and located therebetween these. Finally, an exhaust aperture is formed in the nozzle and provides for passing a jet stream of detonation products in a highly directional nature giving rise to the jet engine thrust.

The reflector element of these devices is a highly unique device provided to reflect an omni-directional detonation shock wave into a directional stream along the system axis. The reflector element is unique in part in that it formed as an aspherical element. The aspherical shape of the reflector gives a performance advantage to the system because it causes the shock wave and detonation products to be reflected in a preferred shaped stream which accelerates due to cumulative effect up to and supersonic speeds. As a result, pulse duration is shorter, frequency of pulse detonation is higher and resulted thrust force is higher for a prescribed size and structure of engine. Thus, the shaped nature of the reflector in combination with a portion of the fuel conveyance structure is of critical importance to the overall objectives of engine taught for the very first time in this disclosure. As such, an aspheric reflector is a critical element of the combustion chamber of these pulse detonation jet engines.

The second primary element of the combustion chamber is the exhaust nozzle which operates in a conventional sense with respect to most jet engine systems except in that its shape and extent may be tuned in relation to specific gas dynamic physics of these engines as it provides a wave of low pressure that comes back to reflector and allow new portion of fuel and oxidizer be injected in combustion chamber and participate in their heating that can affect the overall operation of the resulting resonance.

Fuel Conveyance System

A Fuel Conveyance System plays a major role in improvement of fuel flow characteristics and composition before supplying it into the combustion chamber. Improvements such as chemical structure, temperature, speed, uniformity and flow direction to improve further mixing with oxidizer each contribute to overall engine performance.

Fuel Conveyance Systems of these inventions use gaseous fuels. Gaseous fuel, stored in a reservoir is conveyed from that reservoir to the combustion chamber by way of a fuel conveyance system or fuel conduit. Fuel is provided to the engine with a level of pressure prescribed for engine performance, the pressure being greater than atmospheric pressure. This pressure may be provided by various means such as use of a compressor or use of fuel reservoir with initial pressure, or by subjecting the engine to centrifugal force by locating engine at the tip of a rotor. In case of usage of liquefied hydrocarbon fuel, fuel is evaporated in advance into gaseous phase.

The gaseous fuel can be any of various types of fuel, including a hydrocarbon fuel from the group including: propane, methane and butane and any mixture thereof, as well as hydrogen or dimethyl ether or any mixture thereof. The choice of fuel is determined by the fact that its mixture with the oxidizer is sufficiently detonatable and supports pulse detonation in a particular structure of jet engine.

In jet engines of the present systems, a fuel conduit is an enclosure having several important structures. The unique physical nature of these structures give rise detonation performance, characteristics of fuel flow and finally performance advantages of the engine. A fuel conduit of the invention includes a special shaped cavity, a fuel supplying nozzle and a terminal end opening. It is this unique combination that combines efficiency and, as a result of simplicity, reliability of the engine. In other solutions which are described in the state-of-the-art, systems to raise detonation abilities are used that include energy consuming and non-reliable systems. For example, two stage combustion processes where some portion of fuel mixing with oxidizer and it's combustion heats the remaining fuel in special chamber to increase fuel detonation abilities. Other example of the art is to use mechanical impeller which creates cavitation by vanes rotation. Another example used previously includes usage of fuel with easily ionizable additives, which, under the influence of a magnetic field, increase the detonation performance of the fuel. All these solutions are in strong contrast with structures of this invention as each of those demands spending additional energy and are accordingly less efficient in terms of whole process.

For highest efficiency in these pulse detonation jet engines, it is preferred that the fuel be at elevated temperature and further that it is injected into the combustion chamber at high speed. This may be achieved via construction of special structures described here. The volume of the shaped cavity included as a portion of the fuel conveyance system is reduced with respect to flow direction. That is, from where the fuel enters the cavity from fuel supplying nozzle, the cavity has a relatively large volume and that volume is reduced along the fuel flow path toward the conduit terminal end. This transition in volume promotes an increase in flow velocity of the fuel such that it exits the fuel conveyance system with high kinetic energy to promote more thorough mixing with oxidizer and conversion of kinetic energy for improved heating in combustion chamber. Ratio between volume near fuel supplying nozzle and volume near the conduit terminal end is correspondent with level of increase of velocity of fuel flow.

In versions designed for use of hydrocarbon fuel, for highest efficiency and stability of pulse detonation and reliability of engine in these pulse detonation jet engines, it has been discovered that a very high level pyrolyzing of fuel is preferred. Pyrolyzation is thermal chemical decomposition of fuel. A very high degree of pyrolyzing may be achieved via a special shaped cavity and in further cooperation with fuel injected with an orientation bias to promote spiral flow described here. In particular, a special cavity is shaped as high level pyrolyzing cavity is fashioned as three dimensional volume having at least one surface operable for providing large quantity of heat into the pyrolyzing cavity. Gaseous fuel that flows within the cavity is pyrolyzed as a result of the presence of said heat. To further improve the efficiency of the pyrolyzing cavity the flow nature of the fuel can be manipulated such that the fuel flows within the chamber in a manner that increases duration its exposure to heat provided by the heated surface. In particular, fuel may be injected into the cavity with momentum and direction sufficient to cause it to spiral about the cavity as it passes toward the terminal end of the fuel conduit.

Various sources of heat for the pyrolyzing cavity are possible. For highest efficiency of pulse detonation jet engine heat from combustion chamber a back surface of a reflector element is conveyed into the pyrolyzing cavity via conduction and radiation. In addition to the advantage of providing heat for pyrolyzing fuel, cooling is provided to the combustion chamber which improves its performance. Thus a thermal balance of the system reduces need for additional special structures for engine cooling. In another version a source of heat may be other heated parts of a jet engine, such as detonation initiator, exhaust nozzle or external source of heat, for example an electric heater. Various solutions may be used in presented invention to provide heat to gaseous fuel as it passes through a pyrolyzing cavity. Preferred cases include those not requiring additional energy consumption for heating, which increase efficiency of engine.

Various shapes of pyrolyzing cavity are possible. For example, a cavity may be formed with complex of tubes or tube portion coupled together. The tube or tubes can be placed in thermal contact to a heated surface and fuel passes within the heated tube. The tube can be configured in various geometries in connection with a heated surface of the engine. In this case fuel is heated inside tube as the fuel passes from the source towards the combustion chamber. Cross-section of tube can support various geometries as well, such as round or flat slit. But this structure has a high resistance to the gas flow passing through it. In this case speed of gaseous fuel for supplying to combustion chamber will be lower than in more preferred cases. Nevertheless, these solutions are considered as included versions of the invention.

The best combination of heat transfer from combustion chamber to special shaped cavity and speed of gaseous fuel flow may be achieved via construction of cavity described herefollowing. A special shaped pyrolyzing cavity has structure comprised of complementary shaped bodies of rotation, where a first body of rotation is said aspheric axially symmetric metal reflector of the combustion chamber and second rotation body has same axes that forms an enclosed volume where volume is reduced from an apex end towards open terminal end of the cavity, where distance between said bodies on system axes is much greater than at annular terminal end. These shapes of cavity are preferred for mixing of gaseous fuel and products of pyrolysis in uniform mixture with high detonation potential. As first body of rotation of cavity is reflector of combustion chamber, heat from combustion chamber is transferred to pyrolyzing cavity for heating of fuel flowing therein. Simultaneously, the combustion chamber reflector is cooled. This type of structure allows to keep thermal balance of whole engine and not spend energy for pyrolyzing of fuel. The thickness of reflector must be able to withstand the pressure in the combustion chamber during detonation.

A conventional tube can be provided to convey fuel from a source reservoir to the pyrolyzing cavity. The tube can be terminated as a nozzle near a heated surface of the pyrolyzing cavity such that the fuel is injected therein with a direction that is a result of the orientation of the tube with respect to the geometry of the special shaped body.

To promote improved pyrolyzation, a special nozzle or, plurality of similar nozzles, may be arranged to inject fuel into the pyrolyzing cavity with enough momentum and direction to cause the fuel to flow along a path that allows flow to pass over heated surface with maximum duration. If shaped pyrolyzing cavity has shapes of body of rotation, one preferred path is a spiral around this heated surface body of rotation. The preferred direction of nozzle in this case is tangential with respect to the heated surface and orthogonal with respect to the axes of rotation of the surface.

In other shapes of cavities with heated surface other configurations of flow paths which provide maximum duration of passage of fuel flow over heated surface operably useful. This may be achieved by fins on said cavity walls or allocation of set of nozzles which distribute fuel flows over heated surface of said cavity. These and other possible solutions are included in this invention.

Fuel passes from the source reservoir, through a tube to the nozzle where it is injected into the special shaped cavity to cause the fuel flow passes toward the terminal open end of the fuel conduit. Gaseous fuel then leaves the fuel conduit from this terminal end and is directed into either the combustion chamber or into a mix chamber. Various forms of this terminal are possible, but allocation should be annular around combustion chamber. Particular case of shapes may be one or few holes with round or slit shapes. Preferred shapes are annular slit which allow supplying of gaseous fuel without impediment to promote highest speed.

Oxidizer Conveyance System

Another important system of these jet engines provides for supply of oxidizer. Said system provides for conveyance of gaseous oxidizer. An oxidizer conveyance system transmits oxidizer from a source to the combustion chamber directly or via a mix chamber. Gaseous oxidizer is conveyed to the combustion chamber with a prescribed design pressure that is equal or greater than atmospheric pressure. This pressure may be provided by various ways. In one example, oxidizer is pressurized by a mechanical compressor prior to being received at the oxidizer conveyance system. In a second example, a reservoir of oxidizer includes a pressure chamber that provides for supply of oxidizer at a pressure greater than a surrounding atmosphere. In a preferred example, gaseous oxidizer is made subject to acceleration by way of centrifugal forces generated by an engine being placed at the tip of a rotating system such as an aircraft rotor.

Oxidizer may be included in gas mixtures with inert gases. In particular cases, gaseous oxidizer may be pure gaseous or liquid oxygen, or oxygen with mixture such as air. Source of air can be just atmospheric air from an air intake. In case of use of liquid oxygen, oxygen is evaporated in advance. Using pure oxygen as an oxidizer produces a more detonatable mixture of fuel and oxidizer, but it is much less safe. A most preferred solution for oxidizer is use of environmental air, because air is available in atmosphere. When using these systems for propulsion of a flying aircraft, the atmosphere contains sufficient oxygen up to altitudes that are convenient for normal flying plans.

Like the fuel conveyance system, an oxidizer conveyance system passes flow of oxidizer toward a terminal end opening or exit port. Like the fuel conveyance system oxidizer conveyance system play major role of improvement of fuel flow characteristics before supplying it in combustion chamber such as flow speed. For highest efficiency in these pulse detonation jet engines a high speed flow of oxidizer is preferred. This may be achieved via construction of special structures described here. The volume of the oxidizer conduit is reduced with respect to flow direction. That is, from where the oxidizer enters the conduit has a relatively large volume and that volume is constricted as oxidizer passes to the conduit terminal end. This transition in volume promotes an increase in flow velocity of the oxidizer such that it exits with high kinetic energy which promotes more thorough mixing with gaseous fuel and conversion of kinetic energy in heating in combustion chamber.

However, unlike the fuel conduit, the oxidizer conduit does not benefit from heat input for pyrolyzing. Thus an oxidizer conduit of this jet engine may take an arbitrary convenient shape that finally has the described terminal end from which oxidizer flows at high rate of speed. Forms of this terminal end may be variable, but most preferred versions are annular around the combustion chamber. Particular versions of operable shapes may include a plurality of holes with round or slit shapes. Another preferred version is an annular slit which allows supplying of oxidizer with no obstruction to its speed in an relatively narrow annular slit through which oxidizer may pass and enter into a mix chamber.

Mix Chamber

In some versions that promote a more complete mixing of fuel and oxidizer, a mix chamber receives fuel and oxidizer from their respective conveyance systems into a volume in which these mix together in a vigorous chaotic flow of gases. Gaseous fuel and gaseous oxidizer may exit from concentric annular slits that are positioned quite close together such that mixing naturally begins as the gases flow together. The mix chamber may be merely arranged as small annular volume which couples the two exit slits with a special annular nozzle that injects the mixture into the combustion chamber in a radially inward direction.

This structure allows uniform mixture of fuel and oxidizer before supplying to the combustion chamber. It is especially preferred in case of systems having high centrifugal forces which are common where engines are used on the tip of rotor. Any inhomogeneity in the density of the mixture leads to its stratification under the action of centrifugal forces, which significantly impairs the detonation efficiency.

Injection System

Gaseous fuel and gaseous oxidizer are supplied through terminal ends of fuel and oxidizer supplying systems. While some versions may be arranged to directly inject from the terminal end of the conveyances systems into combustion chamber, preferred version include an intermediate element that is the mix chamber. In case of separate flows of gaseous fuel and oxidizer the injection system is just continuation of terminal end of fuel and oxidizer conduits which directly inject fuel and oxidizer into the combustion chamber.

In versions having a mixing chamber, the injection system is placed in between terminal ends of fuel and oxidizer conveyance systems and combustion chamber and gases in the mixing chamber under pressure from their respective conveyance systems passes through nozzles arranged to inject mixed detonatable gas radially inward toward a system axis in the combustion chamber. It may be arranged as one single nozzle or plurality nozzles which are annular allocated around an annulus of the combustion chamber. Cross sectional shapes of these nozzles may be round or slit. These nozzles direct fuel and oxidizer mixture radially from all directions to center zone of combustion chamber. One version can be arranged to direct mixture flow towards the reflector wall with goal mixture heating from reflector. But preferred direction of directed mixture flow is towards a center zone that is close to a parabolic focus of reflector. Fuel and oxidizer mixture should have maximum possible speed to have maximum kinetic energy that is converted to heat when flow converges in the center. Preferred speed of fuel and oxidizer mixture is supersonic, which may be achieved by special geometric shapes of the nozzles that inject fuel and oxidizer into the combustion chamber. To achieve preferred geometric shapes having this characteristic, a cross section that is pinched in the middle may be used. Or in particular case said cross section has form of de Laval nozzle. Finally injection system structure provides for conditions wherein fuel and oxidizer mixture has highest high detonation potential that is very close to excitation of detonation process.

Detonation Initiators

While it remains possible that some engine geometries may be arranged in an operable form that causes spontaneous detonation, preferred versions affirmatively include a device to initiate detonation. In case of resonance pulse detonation, stable process of detonation demands high level of detonation potential of fuel and oxidizer mixture. Engines that rely upon spontaneous detonation suffer from the condition that it is difficult to achieve and to keep engine cycle time in the instance of different income pressure of fuel and oxidizer and different proportions of them in mixture. Thus, spontaneous detonation type engines are very dependent on working conditions and characteristics of fuel and oxidizer supply. Since it is preferable to include engines having a wide range of conditions of fuel and oxidizer mixture to manage thrust force, some versions of this pulse detonation jet engine further include systems characterized as detonation initiators which help to control cycle timing and other system stabilities.

A detonation initiator is associated with the combustion chamber in a way that allows it to introduce a well-timed physical impulse that falls incident on a fuel-oxidizer gas mixture causing it to detonate. This is particularly important in consideration of any particular gas-dynamic model that demands a cycle period of a prescribed time or frequency. Thus, a detonation initiator can promote timing in agreement with a gas dynamic resonance and the detonation initiator of these systems accounts for and is matched with a natural resonance of the engine. A detonation initiator has to provide an impulse in the zone of combustion chamber where fuel and oxidizer mixture is mostly ready for detonation. In the case of parabolic shapes of the combustion chamber reflector, the zone into which an impulse is provided is a parabolic focus and the center of the annular nozzle that provides detonatable mixture of fuel and oxidizer.

There can be several detonation initiators and their location and operation is consistent with the pulse detonation process. In one particular version, a spark plug is located near the combustion chamber, the heat impulse of which can start the detonation process. In another important version, a detonation initiator is a tube on system axes being closed on the distal end and open on an end proximate to the combustion chamber. This tube passes through the cavity of the fuel conduit described above. A shock wave of detonation products passes through this tube from the combustion chamber to the closed distal end and, after being reflected from it, returns to the combustion chamber, directed to the center of the chamber to meet a renewed mixture of gaseous fuel and air in the central zone described above and initiate detonation of this mixture. The length of the tube is correlated with the time of passage of the shock wave through it is consistent with the time elapsing from the start of detonation of the previous cycle, the subsequent exhaust of detonation products through the exhaust nozzle, the formation of a low pressure wave, and the arrival of a new portion of a mixture of gaseous fuel and air. The tube diameter is chosen so that the pressure burst impulse in the shock wave is sufficient to initiate detonation.

Body

An outer housing or body structure may provide physical containment of the component elements and mechanical support thereof. This outer housing or body may form portions of elements described such as for example a portion of the oxidizer conduit. The outer housing is preferably fashioned from strong, rigid and high temperature (over 1400 C. deg) operated metal whereby it can be structurally integrated with other component parts including the exhaust nozzle, the asymmetric reflector, the fuel conduit and the air conduit, as well as other ancillary system parts.

Support Structures

Finally, these engines may additionally include structural supporting elements such as a spoken system of mechanical support arranged to mount the refector on the system axis in relation to the exhaust nozzle and giving rise to the combustion chamber volume. Additional mechanical structure to support and hold portions of the fuel conveyance system are also included. All elements should be from materials which have ability to work in high temperature conditions, high centrifugal forces conditions and thermal expansion coefficient should be close for different parts as dimensions of slits, nozzles and cavities not changed.

PREFERRED EMBODIMENTS OF THE INVENTIONS

One preferred version of the invention is a pulse detonation jet engine arranged to use propane as gaseous fuel and air as oxidizer. A configuration is devised in which the pressure of the propane fuel at the entrance to fuel conveyance system of engine is realized via centrifugal force and has a magnitude of about between 3-10 atmospheres. Similarly, a configuration is selected to create air pressure due to centrifugal force in the range of about 1-7 atmospheres, this pressure measured at the entrance of the oxidizer conveyance system of engine.

Preferred versions include engine parts made from metal having a thickness of between about 0.3 and 3 mm, the metal further characterized as high-strength, heat-resistant stainless steel E1868 with an operating temperature of 1500 degrees C.

One preferred version includes a combustion chamber (4) as part of a detonation resonator that comprises reflector (9) with a substantially parabolic shape with maximum diameter about 80 millimeters at nozzle of injection system (13). Exhaust nozzle (10) has round aperture linked to combustion chamber (4) by way of proximity and orientation.

An gaseous fuel conveyance system supplies fuel to a partially enclosed cavity which is a pyrolyzing cavity (11). A boundary of the pyrolyzing cavity is formed by the back surface of the reflector of combustion chamber (9). A coaxial second body of rotation herein referred to as a pyrolyzing cavity cover (23) has a similar shape and lies on the system axis. The distance between the apex of the reflector (14) and apex of said cover (15) is preferably between about 5 and 16 millimeters, with 8 mm being one optimally chosen value found to provide superior performance. Terminal end of fuel conveyance system is annular slit (7) with a preferred width of about 1 millimeter, but between about 0.3 and 3 millimeters is an operable range.

An air conveyance system supplies air through a space of arbitrary shape which is inside of body of engine (22) and outside of pyrolyzing cavity cover (23). This space has open terminal end arranged as annular slit (6) having width of about 1 millimeter for best modes and between about 0.3 and 3 millimeters for a useful operable range. The pyrolyzing cavity cover (23) is attached to the body of engine (22) by a plurality of metal ribs which pass through the air conduit cavity.

Annular slits of air conduit and gaseous fuel cavity (6 & 7) are concentric and located next to each other facing a volume which is the mixing chamber (12). This volume is preferably arranged as an annular volume. Flow of gaseous fuel (20) and air (19) mix together in this volume in proportion which depends on pressure of air and gaseous fuel at the entrance to respective conduits of engine (1 & 2). This mixture is very uniform by allocation of components and density.

Mix chamber (12) redirects mixture of gaseous fuel and air to an injection system which is formed as annular nozzle (13) sometimes preferably having a cross section pinched in the middle and orthogonal directed with respect to parabolic reflector's axes (24). In one preferred version, the length of this nozzle is about 5 millimeters having an open aperture directed toward the combustion chamber has a width of 4.3 millimeters. This nozzle provides for the mixture to be injected into the combustion chamber supersonic speed (25).

Figure 2:
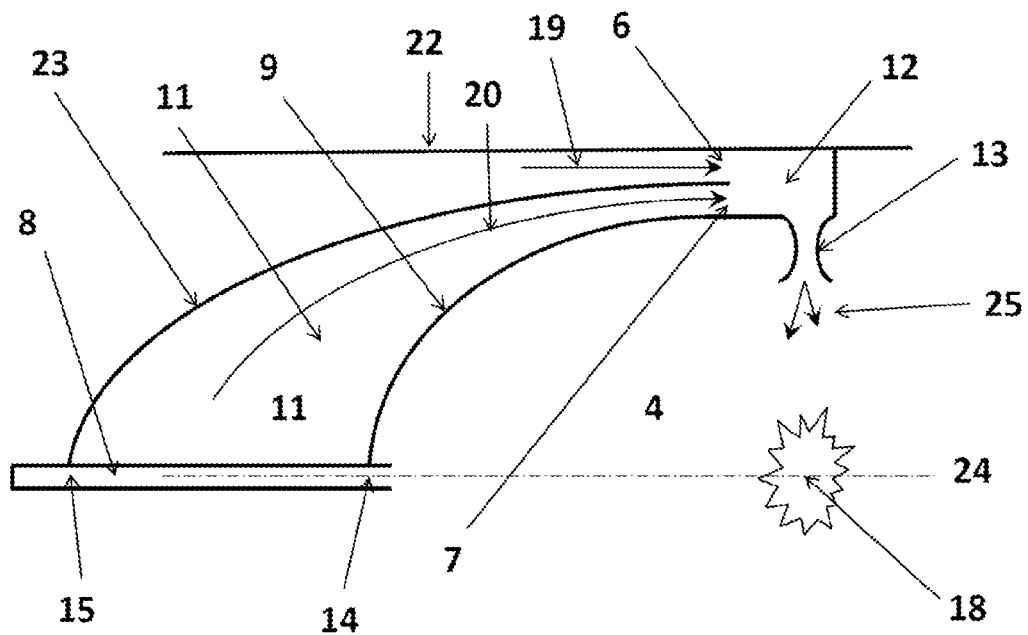
FIG. 2 shows mix chamber and mix nozzle.
Figure 3:
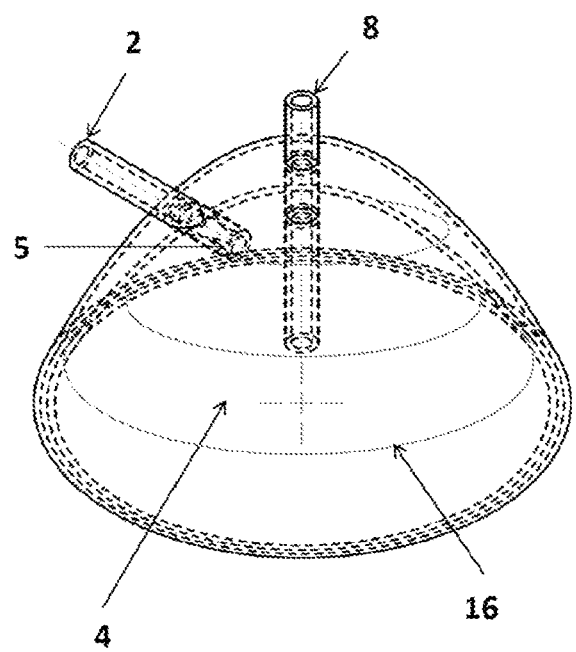
FIG. 3 shows pyrolyzing cavity of gaseous fuel conduit with spiral fuel flow.
Figure 4:
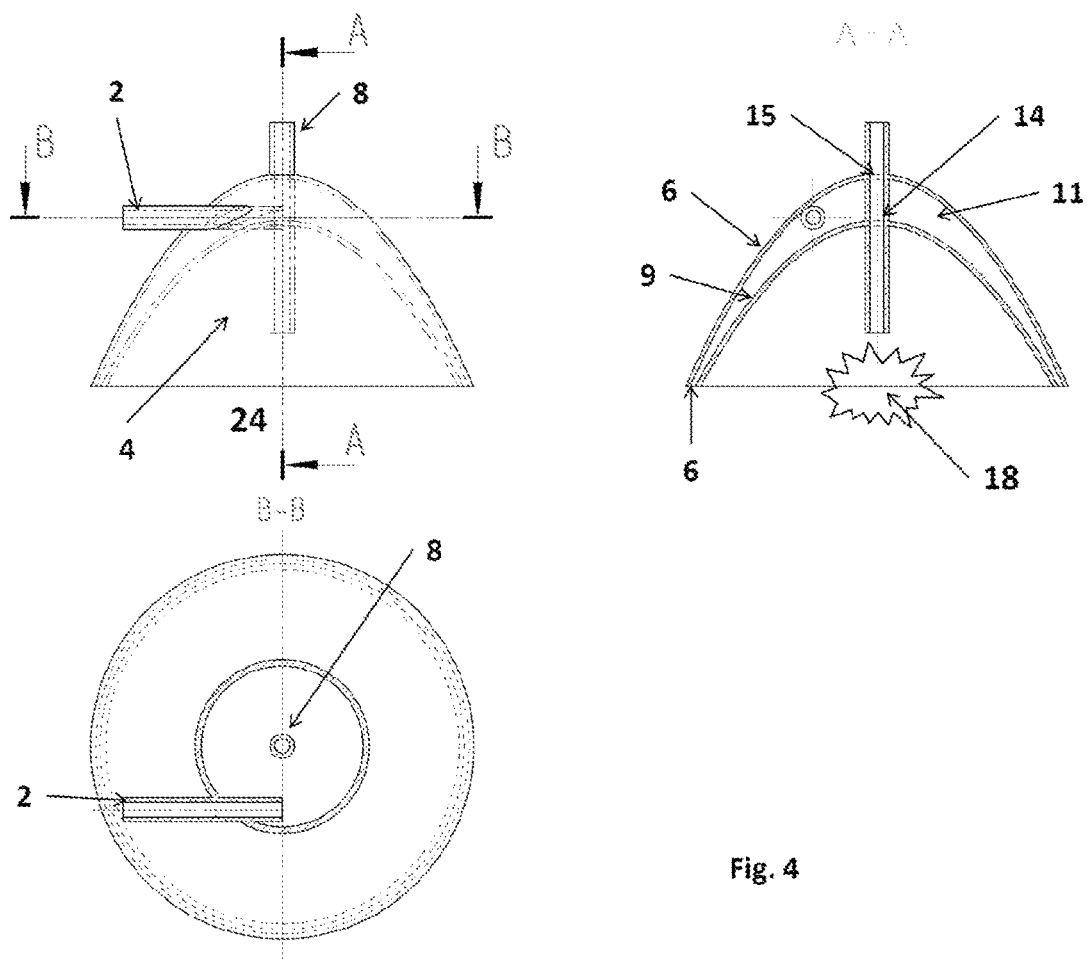
FIG. 4 shows pyrolyzing cavity with cross-sections A-A of detonation initiator tube and B-B of fuel supplying nozzle.

Geometric focus of parabolic reflector is substantially located on the plane of said annular nozzle. Reflector and annular nozzle are allocated as shown on FIG. 2. The wall of annular mix chamber (12) is located opposite of said slits (6 & 7) and is additionally operable for providing structural support to hold the reflector (9) of combustion chamber (4) inside body of engine (22). Exhaust nozzle (10) is a cylinder with diameter of about 70 millimeters and length is preferably about 40 millimeters. One side of exhaust nozzle cylinder is attached to the wall of annular mix chamber and another is an open aperture to outside of the body of engine.

The nozzle for supplying gaseous fuel (5) into said pyrolyzing cavity (11) is located with tangential direction to back surface of reflector and next to the surface of pyrolyzing cavity cover (23) is directed orthogonal to the axis of the system (24). Projection of the point of penetration of nozzle for supplying gaseous fuel inside said pyrolyzing cavity on the axes of system is located in between apexes of reflector (14) and pyrolyzing cavity cover (15).

A detonation initiator (8) is preferably arranged as a tube with 170 millimeter length located on the system axes of. The distal end of this tube is located inside the air conduit and the tube penetrates the pyrolyzing cavity and reflector (9) and attached to them for example by welding. The open end of tube is positioned inside combustion chamber (4) such that is can receive shock waves therein.

In one version the entire system weight is about 0.9 kilograms and steel thickness is 1 mm.

During detonation process, the temperature of the metal reflector of combustion chamber is 1300 degrees C. Gaseous fuel supplied by the fuel nozzle is directed into said cavity of gaseous fuel conduit and makes spiral flow over metal reflector back side.

In best versions, the pulse detonation cycle has frequency in the range of about 10 kilohertz. The maximum thrust force of described pulse detonation engine in case of maximum pressure propane on the entrance to fuel conduit of engine 10 bars is 392 N.

Thus, in the proposed in the present invention preferred embodiment engine design, the required technical results are achieved, since the performance of the pulsating detonation jet engine increases, since its efficiency, specific power and reliability are increased.

The invention claimed is:
1. A pulse detonation jet engine comprising:
    i) a combustion chamber configured as a detonation resonator;
    ii) a gaseous fuel conveyance system comprising a supply nozzle, a conduit, and an open terminal end;
    iii) a gaseous oxidizer conveyance system comprising a conduit having an open terminal end, wherein the open terminal end of the gaseous fuel conveyance system and the open terminal end of the gaseous oxidizer conveyance system are proximally disposed with respect to each other and are concentric with the combustion chamber axis whereby gaseous oxidizer and gaseous fuel exiting these ends are readily mixed into a detonatable mixture that passes radially inward into the combustion chamber; and
    iv) a detonation initiator associated with the combustion chamber, whereby the detonation initiator delivers a physical impulse to initiate detonation in the combustion chamber,
    the detonation resonator is comprised of an aspheric axially symmetric metal reflector and an exhaust nozzle, and
    the gaseous fuel conveyance system conduit comprises a cavity formed between the aspheric axially symmetric metal reflector and a cavity cover, wherein a volume of the cavity decreases between where the fuel enters the cavity from the supply nozzle along a direction of a flow of the gaseous fuel toward the open terminal end of the cavity so as to increase a velocity of the flow of the gaseous fuel.

2. A pulse detonation jet engine of claim 1, wherein said gaseous oxidizer further comprises oxygen or a mixture of oxygen with other gases.

3. A pulse detonation jet engine of claim 2, wherein said gaseous oxidizer further comprises a mixture of oxygen with other gases which is further characterized as air.

4. A pulse detonation jet engine of claim 1, wherein said gaseous fuel conveyance system terminal end is formed as an annular slit with respect to an axis of the symmetric metal reflector.

5. A pulse detonation jet engine of claim 1, wherein said gaseous oxidizer conveyance system terminal end is formed as an annular slit to an axis of the symmetric metal reflector.

6. A pulse detonation jet engine of claim 1, further comprising a mix chamber and mix nozzle, said mix chamber being a cavity open to the open terminal end of the gaseous fuel conveyance system and further open to the open terminal end of the gaseous oxidizer conveyance system whereby the gaseous fuel and the gaseous oxidizer mix together after a flow of each exits from their respective conduits to form the detonatable mixture, said mix nozzle being a nozzle arranged to direct said detonatable mixture into the combustion chamber toward an axis of the detonation resonator.

7. A pulse detonation jet engine of claim 6, wherein said mix nozzle is further characterized as an annular passageway having a cross section pinched in a middle.

8. A pulse detonation jet engine of claim 7, wherein said cross section pinched in the middle is further characterized as a de Laval nozzle.

9. A pulse detonation jet engine of claim 6, wherein said mix nozzle is further characterized as an annular slit.

10. A pulse detonation jet engine of claim 1, wherein said cavity is formed between complementary shaped bodies of rotation, where a first body of rotation is said aspheric axially symmetric metal reflector of the detonation resonator.

11. A pulse detonation jet engine of claim 1, wherein the supply nozzle in the gaseous fuel conveyance system is arranged to provide a directed supply of the gaseous fuel whereby said supplied gaseous fuel spirals within a conduit cavity as it passes from the supply nozzle to the open terminal end.

12. A pulse detonation jet engine of claim 1, wherein said aspheric axially symmetric metal reflector has two surfaces including: a first surface exposed to a combustion space that is operable for reflecting combustion products out of the exhaust nozzle and a second surface forming a portion of the gaseous fuel conduit that is operable for providing heat to the cavity in which gaseous fuel is conveyed.

13. A pulse detonation jet engine of claim 10, wherein said first body of rotation is coaxial with said second body of rotation each having an apex on a reflector axis, and wherein a distance between apexes is greater than a width of an annular slit of the gaseous fuel supply system.

14. A pulse detonation jet engine of claim 1, wherein said supply nozzle is a having an opening coupled to the gaseous fuel conduit cavity, and wherein an orientation of the tube with respect to the cavity gives rise to directionality and a spiral flow of a gaseous fuel stream.

15. A pulse detonation jet engine of claim 1, wherein said detonation initiator is arranged as a tube on a reflector axis, the tube being closed on a distal end and open on an end proximate to the combustion chamber whereby a detonation products shockwave that enters the tube is reflected and returned back into the combustion chamber and initiates detonation.

16. A pulse detonation jet engine of claim 1, wherein said detonation initiator is a spark plug located next to the combustion chamber.

17. A pulse detonation jet engine of claim 1, wherein said gaseous fuel further comprises a hydrocarbon fuel characterized as any from the group including: propane, methane, butane, or a mixture thereof.

18. A pulse detonation jet engine of claim 1, wherein said gaseous fuel further comprises hydrogen.

19. A pulse detonation jet engine of claim 1, wherein said gaseous fuel further comprises a dimethyl ether.

20. A pulse detonation jet engine of claim 1, wherein said gaseous fuel further comprises a mixture of a hydrocarbon fuel, hydrogen, and dimethyl ether.

* * * * *